United States Patent [19]
Glimpel et al.

[11] Patent Number: 4,801,227
[45] Date of Patent: Jan. 31, 1989

[54] CLAMPING DEVICE FOR WORKPIECES OR TOOLS WITH A HIGH CONCENTRICITY ACCURACY

[75] Inventors: Helmut Glimpel; Volker Wenzel, both of Lauf, Fed. Rep. of Germany

[73] Assignee: Emuge-Werk Richard Glimpel Fabrik fur Präzisionwerkzeuge (vormals Moschkau & Glimpel), Lauf, Fed. Rep. of Germany

[21] Appl. No.: 107,702

[22] Filed: Oct. 9, 1987

[30] Foreign Application Priority Data
Oct. 28, 1986 [DE] Fed. Rep. of Germany ....... 3636581

[51] Int. Cl.4 ................................................ B23C 1/00
[52] U.S. Cl. .................................. 409/234; 408/239 R
[58] Field of Search ....................... 409/231, 233, 234; 408/204, 239 R; 279/2 R, 7

[56] References Cited

U.S. PATENT DOCUMENTS

| | | | |
|---|---|---|---|
| 4,504,179 | 3/1985 | Nicolin | 409/234 |
| 4,630,980 | 12/1986 | Kubo | 409/234 |
| 4,642,005 | 2/1987 | Kondo et al. | 409/234 |
| 4,684,301 | 8/1987 | Eckle | 409/234 |

*Primary Examiner*—Léon Scott, Jr.
*Attorney, Agent, or Firm*—Jordan and Hamburg

[57] ABSTRACT

A clamping device for workpieces or tools with a high concentricity utilizes a shank part supported in a cylindrical borehole of a base body, and an adjusting device disposed in the support area of the shank part includes several tapped holes, especially tapered tapped holes in the base body, which are distributed in a radial plane, as well as tapered bolts which can be screwed into the tapped holes.

12 Claims, 2 Drawing Sheets

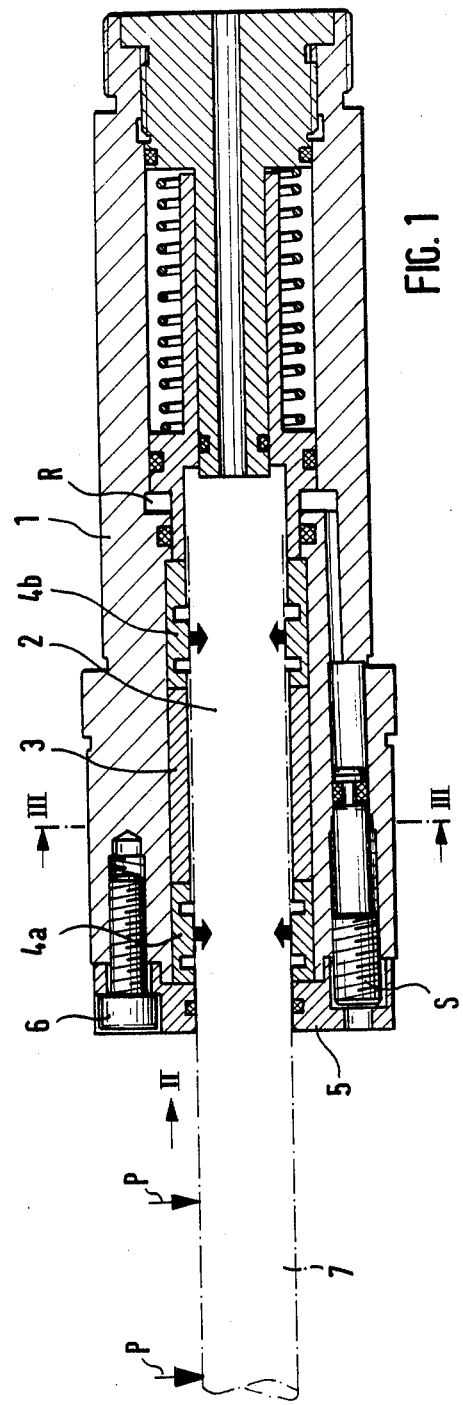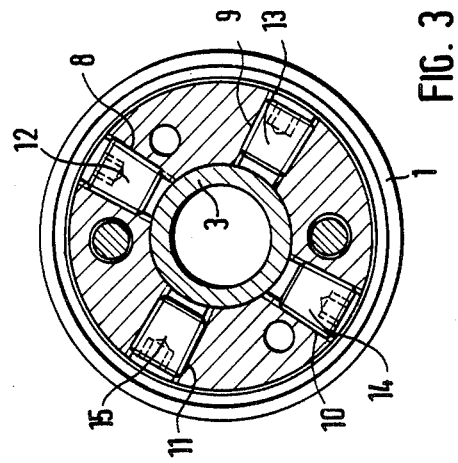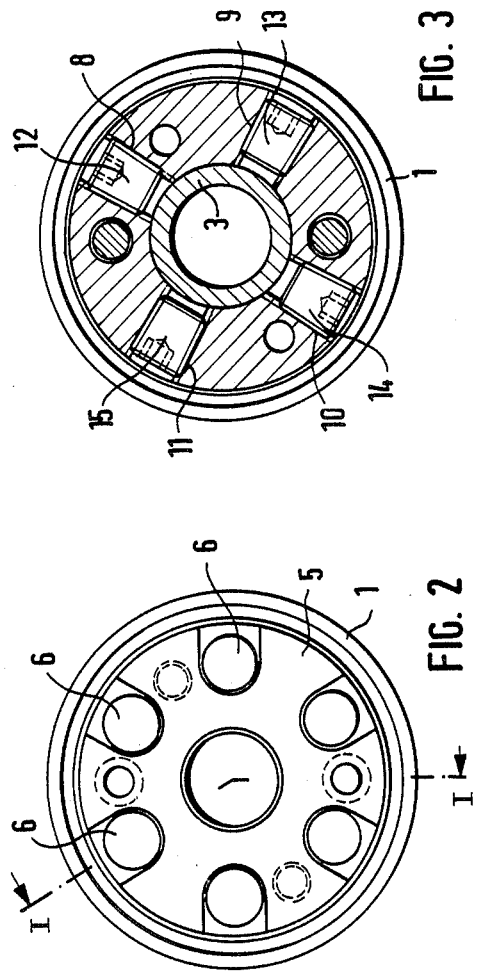

CLAMPING DEVICE FOR WORKPIECES OR TOOLS WITH A HIGH CONCENTRICITY ACCURACY

This invention relates to a clamping device for workpieces or tools with a high concentricity accuracy and wherein a shank part is supported in a cylindrical borehole of a base body.

Aside from hydraulic clamping devices, mechanical clamping systems are preferably used to achieve high concentricity accuracy. For these devices, the changeability of the diameter of the clamping sleeve is made possible either by longitudinal grooves or by internal and external annular recessed grooves which are mutually offset in the axial direction. By axially butting the clamping sleeve together by means of an adjusting nut or the like, the internal and external diameters are changed simultaneously, so that the clamping sleeve is supported towards the outside in the borehole of the cylindrical base body as well as towards the inside at the cylindrical outer wall of the workpiece or tool. However, for extremely high concentricity accuracy in the $\mu$ range, unavoidable other tolerance errors in the manufacture of the components are still too high, even if several axially spaced clamping sites are provided. This is so especially if one takes into consideration that, after all, a high clamping force and, with that, a large transferable torque should be guaranteed. This in turn results in increased distortion and twisting.

To correct parallelism error and the error in angle, which is usually present as well, compensating intermediate flanges have already been proposed. However, these are very expensive and complicated and make the arrangement unbalanced.

It is therefore an object of the invention to provide a clamping device of the initially-named type wherein the possible concentricity errors, especially errors in angle which are based on tilting of the longitudinal axis of the tool or workpiece relative to the longitudinal axis of the clamping device, can be compensated for to the greatest extent possible.

According to the present invention, this objective is achieved by disposing in the support area of the shank part an adjusting device which comprises several tapped holes, especially conical tapped holes, in a base body and which are distributed in a radial plane, as well as tapered bolts which can be screwed into these holes. For the sake of simplicity, only tapered tapped holes are referred to in the following description, although the tapped holes are not limited to the tapered type.

By means of the adjusting device of the invention, for which preferably three or more mutually offset tapped holes are disposed in the base body, a different distortion of the base body can be achieved in the radial plane, depending on the extent to which the tapered bolts are screwed into their conical boreholes. Of course, only a very small cone angle is provided. This different distortion leads to a deformation of the base body and, with that, to a change in the angular position of the shank part of a workpiece or tool supported in it. In this manner, a correction can be made—controlled by means of external measurement points on the actual workpiece or tool itself —of the angular errors that have arisen on clamping the respective tool or workpiece. Not only are the errors in angle to be corrected, which may have resulted from mounting the shank part in the base body, but also any errors in angle, which may occur due to the clamping of further workpieces or tools, which in turn may be clamped in the shank part which is mounted in the base body. An example of this is the use of a clamping chuck, the shank part of which is mounted in the base body, while the actual tool is clamped firmly in the clamping chuck itself with the help of a mechanical or hydraulic clamping device. Conversely, an arrangement may also be used for which the clamping device is disposed directly in the support area of the borehole of the base body that is provided with the adjusting device, the clamping device being in the form of mechanically or hydraulically controllable clamping sleeves without the intervention of a clamping chuck.

To be able to correct not only the particularly important errors in angle, which have been addressed above, but also parallelism errors, that is parallel shifts in the axis of the tool or workpiece relative to the axis of the base body, which, after all, represents the axis of rotation in many cases, provisions can be made in a further development of the invention to ensure that the tapered bolts have internal, tapped throughholes for compensating bolts to correct errors in parallelism.

This arrangement preferably is made so that the compensating bolts engage the clamping part, especially a clamping chuck or an intermediate sleeve which has a front flange disposed against the plane front surface of the base body and which can be displaced in a sliding motion. When mounting a workpiece or tool with the help of a clamping sleeve mounted directly in the borehole of the base body, the adjusting device may also be installed next to a clamping site, for example, also behind the clamping site lying furthest in the base body, or also, preferably, between two clamping sites or in the area of a spacer mounted next to or between two clamping sleeves.

Further advantages, characteristics and details of the invention will appear from the following description as well as from the accompanying drawings.

BRIEF DESCRIPTION OF THE DRAWINGS

FIG. 1 is an axial sectional view of a clamping device of one embodiment of the invention with a mechanical clamping system and two clamping sites taken along the line I—I in FIG. 2.

FIG. 2 is a front view of the arrangement of FIG. 1.

FIG. 3 is a sectional view taken along the line III—III in FIG. 1.

DESCRIPTION OF THE PREFERRED EMBODIMENTS

Figure 4:
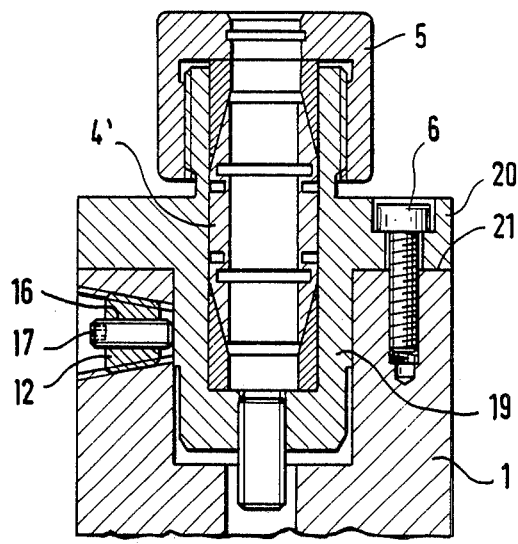
FIG. 4 is a schematic partial sectional view of a modified embodiment with an intermediate liner as well as compensating bolts passing through tapered bolts to correct parallelism errors.

The example of the embodiment shown in FIGS. 1 to 3 comprises a base body 1 having a cylindrical internal borehole 2 in which two clamping sleeves 4a and 4b, separated by a spacer 3, are disposed. The clamping sleeves, 4a, 4b, fixed on the front side by a cover 5 which is mounted rigidly on the base body 1 by means of bolts 6, are acted upon from the rear by a spring, the tension of which is released by means of an adjusting screw S by means of which the hydraulic pressure in space R can be varied. This arrangement per se is, however, already known and the particulars of it will therefore not be explained in greater detail.

Through the arrangement of axially butting together, there is a simultaneous diameter change in the internal and external diameters of the clamping sleeves 4a and 4b, so that these are supported towards the outside in the borehole 2 of the cylindrical base body 1 and, as indicated by the heavy arrow, towards the inside of the cylindrical outer wall of a workpiece or tool 7 which is indicated by segmented lines. Between the two clamping positions of the clamping sleeves 4a, 4b, tapered tapped holes 8 to 11 are disposed in a radial plane in the base body 1. Into these holes, which are mutually offset in each case by about 90°, tapered bolts 12 to 15 are threaded. Since an equidistant offsetting is not important, the offsetting of the tapered tapped holes 8 to 11 is selected as permitted by the space relationships (in this connection, see especially FIG. 3). By screwing one of these screws 12 to 15 further into the respective tapered borehole 8 to 11, a distortion of the base body 1 results which thereby provides an angular displacement in the base body 1. By determining the error in angle of the concentricity accuracy with the help of one or several measurement points P on the workpiece or tool 7, extensive adjustment and correction of this error in angle can thus be achieved over an appropriately oppositely directed tilting by tightening one or the other of the tapered bolts further.

In the embodiment shown in FIG. 4, the tapered bolts 12 to 15, of which only tapered bolt 12 is shown in FIG. 4, are additionally provided with internal tapped holes for screwing in compensating screws 17. These compensating screws 17 engage a clamping chuck 19 which accommodates a clamping sleeve 4 with two clamping sites. The clamping chuck 19 is provided with a front flange 20 which is disposed against a plane front surface 21 of the base body 1 and can be displaced in a sliding motion (which means that the mounting screws 6 are not tightened to an extreme extent), so that compensation for parallelism error is possible with the help of the compensating screws 17 in each of the tapered bolts 12 to 15.

Figure 5:
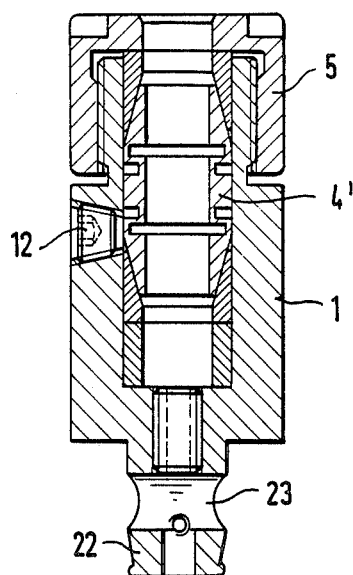
FIG. 5 is a sectional view of a clamping chuck which represents a simplified version compared to that of FIG. 1, and in which the base body is provided with an interconnecting lug for mounting on any turning device, the adjusting device being disposed in the region of the clamping sleeves.

An embodiment of the clamping device of the invention, simpler than that of FIG. 1, is shown in FIG. 5, wherein the back spring and the hydraulic pressure relief device have been omitted. Moreover, a cover 5 is constructed as a cap screw so that separate mounting screws 6 are not required. With the help of a shank part 22 with a transverse borehole 23 for engaging a clamping element in a rotating spindle, which is not shown, or some other rotating machine part, the clamping device of FIG. 5 can be flanged to any machines provided with conventional commercial plug-in inserts and the errors in angle, which are unavoidable in practice, can be compensated for with the help of the inventive adjusting device.

Figure 6:
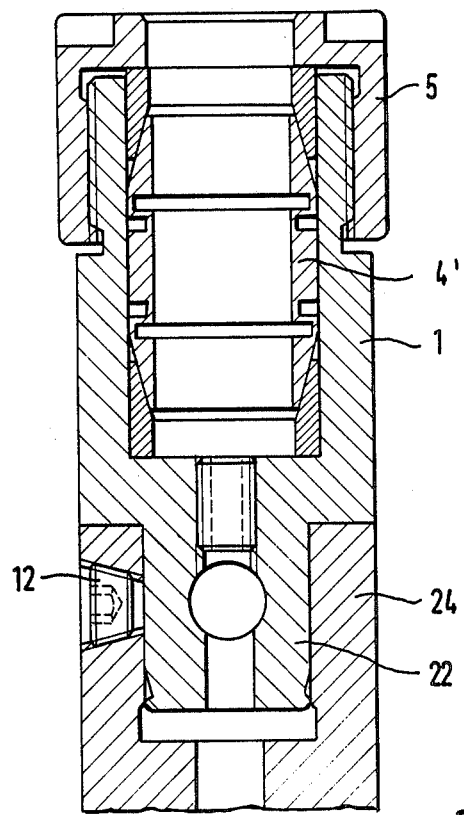
FIG. 6 is a sectional view of a modified arrangement in which the adjusting device is not disposed in the area of the clamping sleeves but in the area in which the clamping chuck, which holds the slamping sleeves, is mounted in a lathe spindle.

FIG. 6 shows a clamping device in which the essential parts correspond to those of FIG. 5. However, the adjusting device with the tapered bolts 12 to 15 is not disposed in the area in which the clamping sleeve 4' is supported, but in the area in which an interconnecting lug 22 with a rotating machine part 24 is supported. With respect to this arrangement of the adjusting device, the embodiment of FIG. 6 corresponds essentially to the arrangement of FIG. 4 in which a clamping chuck 19 is provided. Of course, the part, which is labeled as base body 1 in FIG. 6, can also be regarded as a type of chuck so that the rotating machine part 24 can then be referred to as a base body.

What we claim is:

1. A clamping device for workpieces or tools having a high accuracy of concentricity comprising a base body means having a cylindrical hole for receiving a shank part of a workpiece or tool, adjusting means on said base body means for adjusting the accuracy of concentricity of said workpiece or tool, said adjusting means comprising means defining a plurality of threaded holes in said base body means and each having a central axis extending in a generally radial direction and disposed in a generally radial plane, and bolt means threaded in each of said holes such that threading said bolt means into said holes provides for variable distortion of said base body means to thereby adjust the position and concentricity of the workpiece or tool in the clamping device.

2. A clamping device according to claim 1, wherein said threaded holes are tapered to have a generally truncated conical configuration.

3. A clamping device according to claim 2, wherein said bolt means comprise threaded bolts having a generally truncated conical configuration.

4. A clamping device according to claim 1, wherein there are at least three of said threaded holes in said base body means spaced from one another.

5. A clamping device according to claim 1, wherein said bolt means further comprises threaded through holes receiving threaded compensating screws for adjusting the parallelism of said workpiece or tool.

6. A clamping device according to claim 5, wherein each of said bolt means has a radially disposed axis, each of said compensating screws having a radially disposed axis which is coincident with the radial axis of the respective bolt means.

7. A clamping device according to claim 5, wherein said base body means comprises a clamping chuck means disposed in a base body member, said clamping chuck means receiving said shank, said compensating screws engaging said clamping chuck means.

8. A clamping device according to claim 1, wherein said base body means comprises a clamping chuck means disposed in a base body member, said base body member having a longitudinal end face perpendicular to the axis of said cylindrical hole, said clamping chuck means having a radial flange disposed against said end face and arranged to be displaceable with a sliding motion relative to said end face.

9. A clamping device according to claim 1, wherein said base body means comprises a clamping chuck means disposed in a base body member, said clamping chuck means defining said cylindrical hole of said base body, said clamping chuck means being mechanically or hydraulically operable to effect a diameter change of the clamping chuck means to effect a clamping action on said shank, said clamping chuck means comprising clamping sleeves, said adjusting means being disposed next to one of said clamping sleeves.

10. A clamping device according to claim 9, wherein said clamping chuck means comprises two clamping sleeves spaced from one another, said adjusting means being disposed about said space between said two adjusting sleeves.

11. A clamping device according to claim 10, wherein said clamping chuck means comprises a spacer between said two clamping sleeves, said adjusting means being disposed about said spacer.

12. A clamping device according to claim 9, wherein said clamping chuck means comprises a spacer disposed next to at least one of said clamping sleeves, said adjusting means being disposed about said spacer.

* * * * *